United States Patent [19]

White

[11] 4,398,421
[45] Aug. 16, 1983

[54] ULTRASONIC THICKNESS MEASURING APPARATUS AND METHOD

[75] Inventor: Dennis A. White, Stafford Springs, Conn.

[73] Assignee: Hartford Steam Boiler Inspection and Insurance Company, Hartford, Conn.

[21] Appl. No.: 333,923

[22] Filed: Dec. 23, 1981

[51] Int. Cl.³ ............................................. G01N 29/00
[52] U.S. Cl. ....................................... 73/597; 73/627; 73/628; 73/644
[58] Field of Search .................... 73/597, 627, 644, 628

[56] References Cited

U.S. PATENT DOCUMENTS

| | | |
|---|---|---|
| 2,439,130 | 4/1948 | Firestone . |
| 2,723,556 | 11/1955 | Willard . |
| 3,003,351 | 10/1961 | Ziegler . |
| 3,108,469 | 10/1963 | Dyer et al. . |
| 3,315,520 | 4/1967 | Carnevale et al. . |
| 3,325,781 | 6/1967 | Harris . |
| 3,416,365 | 12/1968 | Frederick . |
| 3,512,400 | 5/1970 | Lynnworth . |
| 3,554,013 | 1/1971 | Berg . |
| 3,624,712 | 11/1971 | Weighart . |
| 3,720,098 | 3/1973 | Dixon .................... 73/597 |
| 3,844,163 | 10/1974 | Di Leo . |
| 3,918,296 | 11/1975 | Kitada . |
| 3,994,154 | 11/1976 | Niklas et al. ............ 73/597 |
| 4,080,836 | 3/1978 | Thompson et al. ..... 73/597 |
| 4,114,455 | 9/1978 | Walker ................... 73/629 |
| 4,137,779 | 2/1979 | Wustenberg et al. ... 73/627 |
| 4,182,155 | 1/1980 | Fowler .................... 73/644 |
| 4,338,820 | 7/1982 | Jassly et al. ............ 73/597 |
| 4,375,167 | 3/1983 | Nusbickel, Jr. et al. ... 73/644 |

OTHER PUBLICATIONS

D. M. Egle and D. E. Bray, Application of the Acousto-elastic Effect of Rail Stress Measurement, Mar. 1979.

Primary Examiner—Howard A. Birmiel

[57] ABSTRACT

In a method for ultrasonically measuring the thickness between opposed surfaces of a workpiece from one surface, a velocity parameter of ultrasonic longitudinal waves through the material of a workpiece is measured at a location along a first surface of the workpiece. Ultrasonic longitudinal waves are transmitted from one surface to the opposite surface, and the ultrasonic waves reflected from the opposite surface are received and a time parameter between transmission of the longitudinal waves and reception of the reflected waves is measured. The thickness between the opposed surfaces is determined from the measured velocity parameter and the measured time parameter. A device for measuring the thickness of a workpiece from one surface includes a transducer assembly with a pair of spaced apart transducer units each having a coupling member and a piezoelectric element mounted thereon. A third coupling member has a pair of piezoelectrics elements mounted thereon, and an electrical circuit connected to the piezoelectric elements for control and measurement. The piezoelectric element is mounted on the first coupling member of one of the pair of transducer units at a predetermined angle relative to the bottom surface to generate a subsurface longitudinal ultrasonic wave through the workpiece to be tested and to be received by the other piezoelectric element of the pair of units. The measuring device further includes apparatus for supplying couplant medium to the interface between the bottom surface of the coupling members and on the workpiece, and means for supporting and moving the transducer assembly along the workpiece.

35 Claims, 6 Drawing Figures

ULTRASONIC THICKNESS MEASURING APPARATUS AND METHOD

BACKGROUND OF THE INVENTION

This invention relates to ultrasonic measurement and more particularly to ultrasonic thickness measurement conducted from one surface of a workpiece comprised of metallurgically inconsistent material or material for which a reliable ultrasonic velocity standard is not available.

Ultrasonic devices are extensively used to measure the thickness of a workpiece as shown in U.S. Pat. No. 3,642,712 to Weighart and U.S. Pat. No. 3,918,296 to Kitada and are particularly desirable when access is limited to only one surface of the workpiece to be measured. For example, in the paper industry it is necessary to periodically measure the thickness of the cast iron dryer roll shells to insure adequate thickness because they contain steam under substantial pressure. Due to the configuration of these dryer rolls, access is generally limited to the outer surface of the rolls (otherwise a destructive penetration of the roll must be performed).

Ultrasonic thickness measuring instruments have generally utilized a velocity calibration "standard" for the particular material of the workpiece to be tested since the velocity of ultrasonic waves is dependent upon the composition of the material being tested and the wave velocity in the material must be considered a known quantity to determine thickness. Inaccuracies are thus introduced into the measurement when the velocity calibration "standard" differs from the actual velocity characteristics of the workpiece. It is also common for a workpiece to exhibit varying velocity characteristics at distinct portions of the workpiece due to inherent metallurgical inconsistencies in the workpiece material such as variations in the alloy composition or in the crystalline structure.

Cast iron provides a good example of this problem because of the metallurgical inconsistency of cast iron from one sample to another due to the variations in alloying constituents (e.g. carbon, silicon, etc.) as well as variations dependent upon the manufacturing process. A workpiece of cast iron commonly exhibits metallurgical inconsistencies from one portion of the workpiece to another so as to significantly vary the velocity of ultrasonic waves at different points.

Accordingly, either the lack of an accurate velocity calibration "standard" for the particular material or the presence of metallurgically inconsistent characteristics within the workpiece material itself will introduce unacceptable error into ultrasonic measurement instruments for many critical applications.

It is an object of this invention to provide a novel improved method and apparatus for ultrasonically measuring the thickness between opposed surfaces of a workpiece with access to only one surface.

It is also an object of the invention to provide such a method and apparatus for ultrasonic measurement which provides accurate measurement of workpieces for which no reliable calibration standard exists.

Another object is to provide such a method and apparatus for ultrasonic measurement of materials which exhibit inconsistent composition and metallurgical characteristics.

A further object is to provide an apparatus for ultrasonic measurement that provides accurate, convenient, and quick multiple measurements of a large workpiece.

A still further object of the invention is to provide an ultrasonic measuring apparatus that is economical to manufacture, durable in use, conveniently operable in the field; and refined in appearance.

SUMMARY OF THE INVENTION

It has now been found that the foregoing and related objects may be readily attained in an ultrasonic method for measuring the thickness between opposed surfaces of a workpiece from one surface thereof which includes the steps of measuring a velocity parameter of subsurface ultrasonic longitudinal waves through the material of the workpiece at a location along a first surface of the workpiece, transmitting ultrasonic longitudinal waves from the first surface to the opposite surface of the workpiece, receiving the ultrasonic waves reflected from the opposite surface, measuring a time parameter between transmission of the longitudinal waves and reception of the reflected waves, and determining the thickness between the first and opposite surfaces from the measured velocity parameter and the measured time parameter.

The step of measuring the velocity parameter of the subsurface ultrasonic longitudinal waves includes providing a pair of transducer assemblies on the first surface at points spaced apart a predetermined distance, transmitting ultrasonic longitudinal waves into the first surface at an angle of incidence to produce the subsurface longitudinal waves, receiving the subsurface longitudinal waves exiting the first surface into the second transducer assembly at substantially the same angle, acoustically insulating the first and second transducer assemblies from transmission of ultrasonic waves directly therebetween, and determining the velocity parameter of the longitudinal waves so transmitted and received. The velocity is determined by measuring the time between transmission by the first transducer assembly and reception by the second transducer assembly and factoring the measured time into the predetermined distance.

The ultrasonic device of this invention for measuring the thickness of a workpiece from one surface includes a transducer assembly having a first coupling member with a first surface for disposition against the workpiece to be tested and a first piezoelectric means mounted thereon for transmitting ultrasonic longitudinal waves at a predetermined angle of incidence to the first surface, a second coupling member having a first surface for disposition against the workpiece in predetermined spaced-apart disposition to the first coupling member with a second piezoelectric means mounted thereon for receiving ultrasonic longitudinal waves passing into said coupling member at a predetermined angle to the first surface substantially equal to the predetermined angle of incidence in said first coupling member, a third coupling member with a first surface for disposition against the workpiece between the first and second coupling members having a third piezoelectric means for transmitting ultrasonic longitudinal waves into one surface of the workpiece and receiving ultrasonic longitudinal waves reflected back from the opposite surface, means for acoustically insulating the coupling members from transmission of ultrasonic waves directly therebetween, and an electrical circuit connected to the piezoelectric means for transmitting and receiving the ultrasonic waves through the workpiece to determine a velocity parameter and the thickness of the workpiece. The device further includes apparatus for supplying couplant medium to the bottom surfaces of the coupling members and for moving the transducer carriage along an extended workpiece. The third coupling member is disposed between the first and second coupling members with a layer of organic acoustical damping material therebetween and a housing encompasses the coupling members to form a unitary structure. The housing is mounted within a transducer carriage for movement over the workpiece. Couplant ports for attachment to the apparatus for supplying couplant medium are located in the transducer carriage and the housing.

DETAILED DESCRIPTION OF THE ILLUSTRATED EMBODIMENT

Figure 1:
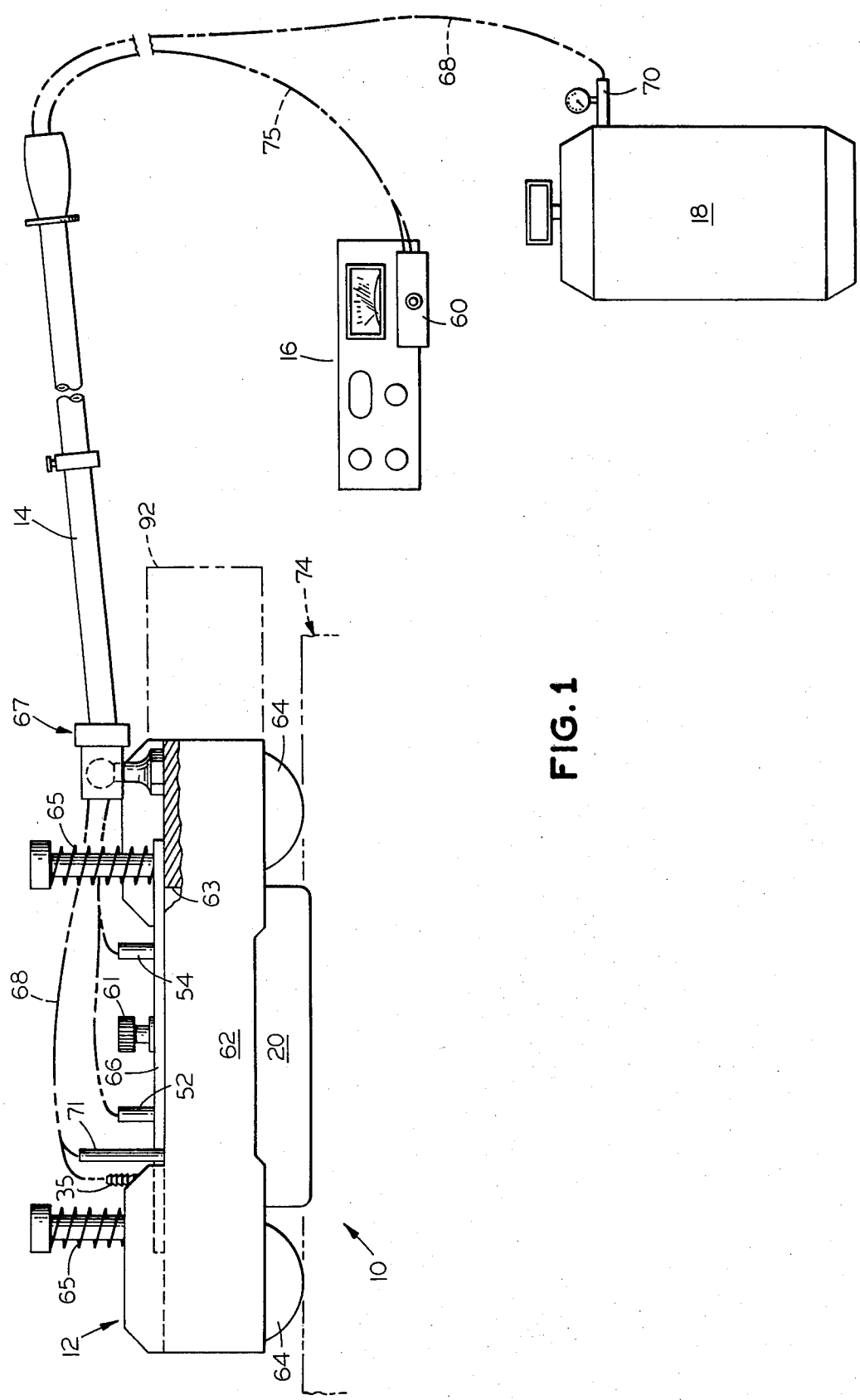
FIG. 1 is a diagramatic view of the ultrasonic measurement apparatus with a portion of the transducer assembly broken away to reveal internal construction.

As seen in FIG. 1, the ultrasonic measuring apparatus of the present invention is comprised of a transducer carriage generally designated by the numeral 12, the retractable handle 14, the electronic circuit assembly or gauge generally designated by the numeral 16, the couplant tank generally designated by the numeral 18, and the transducer assembly generally designated by the numeral 20. The apparatus is shown as disposed upon the upper surface of a workpiece fragmentally illustrated in phantom line and generally designated by the number 74.

Figure 3:
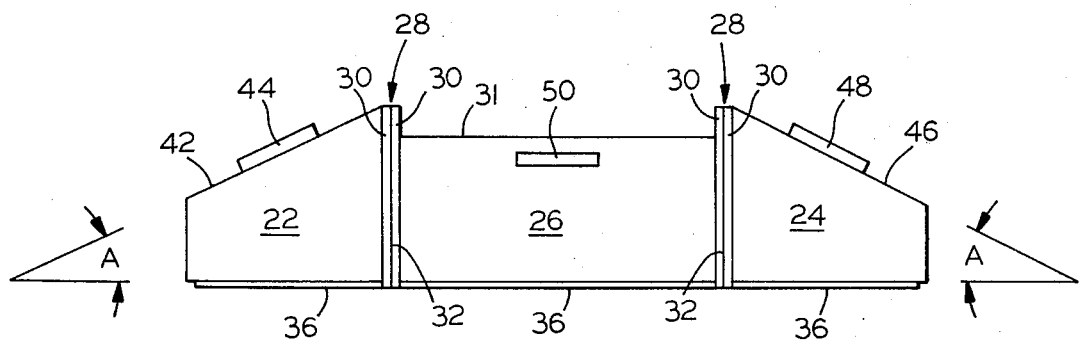
FIG. 3 is an enlarged transverse sectional view of the transducer elements.
Figure 2:
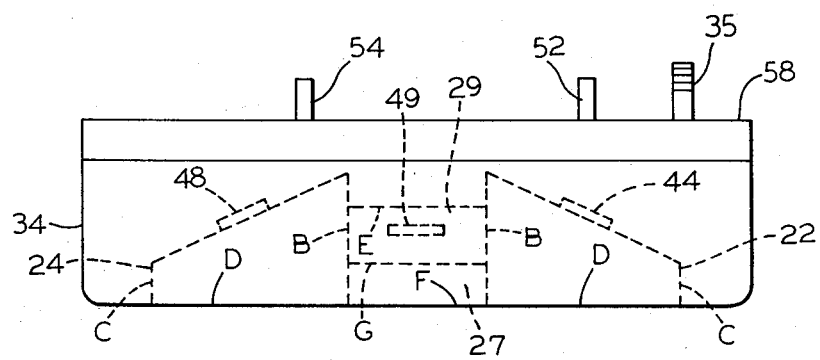
FIG. 2 is an enlarged side elevational view of the transducer assembly with the individual transducer elements shown in phantom line.
Figure 6:
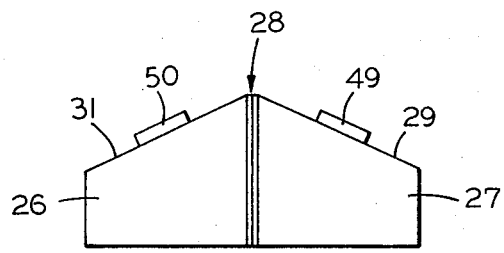
FIG. 6 is an enlarged fragmentary sectional view through the transducer assembly illustrating the annular relationship of the piezoelectric elements utilized for thickness measurement.

As seen in FIGS. 2 and 3, the transducer assembly 20 is mounted within the transducer carriage 12 and includes a first coupling member or wedge 22 and a second coupling member or wedge 24 located in spaced-apart disposition relative to member 22. Positioned between coupling members 22 and 24 are a third coupling member 26 and a fourth coupling member 27. Acoustic insulating means or buffer barriers generally designated by the numeral 28 are interposed between the respective coupling members as seen in FIG. 3, and the insulating means 28 comprises cork sheets 30 impregnated with an acoustic damping material and a copper plate 32. Other organic damping materials may also be utilized. The coupling members are acoustically insulated from each other to prevent transmission of ultrasonic waves directly therebetween (known as "cross-talk"), i.e., to prevent transmission and reception of ultrasonic waves other than through the workpiece to be tested.

As shown in FIG. 3, the upper surface 42 of coupling member 22 is inclined at an angle A with respect to its bottom surface to facilitate mounting piezoelectric element 44 at a predetermined angle to the bottom surface so as to obtain a predetermined angle of incidence I of the ultrasonic longitudinal waves transmitted by piezoelectric element 44 through the coupling member 22 into the workpiece 74 to be tested. The angle of incidence I is related to angle A by a mathematical relation wherein $I = 90 - A$.

Similarly, coupling member 24 has its upper surface 46 inclined at an angle A to facilitate the orientation of piezoelectric element 48 mounted thereon relative to its bottom surface. This configuration can accomplish the transmission of subsurface ultrasonic longitudinal waves from piezoelectric element 44 through coupling member 22 into the workpiece (at an angle of incidence I), through the workpiece below the surface thereof, and from the workpiece through coupling member 24 to piezoelectric element 48, as will be described more fully hereinafter with respect to FIG. 5. Due to the symmetry of the configuration, subsurface longitudinal waves could alternately be transmitted from piezoelectric element 48 to piezoelectric element 44.

The buffer barriers 28 prevent cross-talk between piezoelectric elements 44 and 48. Coupling members 26 and 27 (together with the presence of couplant medium (not shown) at the interface of the surface of the workpiece 74 and the coupling members) effectively reduce surface wave transmission between piezoelectric elements 44 and 48.

Mounted on the upper surfaces 29 and 31, respectively, of the coupling members 27 and 26 are piezoelectric elements 49 and 50. Coupling members 27 and 26 are symmetrical with upper surfaces 29 and 31 oppositely inclined to an apex therebetween at substantially equal angles to facilitate pulse-echo operation therebetween. Piezoelectric elements 44, 48, 49, 50 are located at a vertical distance about the bottom surface of their respective coupling members so as to exhibit substantially equal delay line distances or paths of travel for the waves. Alternatively, electrical delay means may be provided in the circuit asembly to compensate for diverse delay lines.

Figure 4:
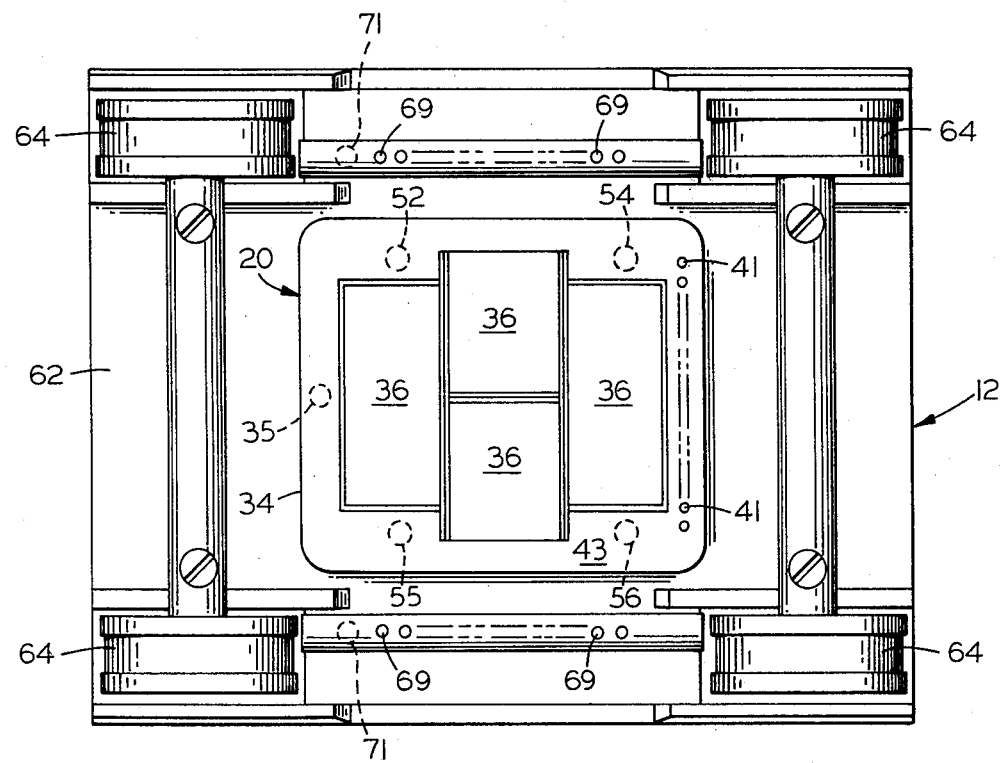
FIG. 4 is a bottom view of the transducer carriage and transduer assembly of FIG. 1 drawn to an enlarged scale.

As seen in FIG. 2, a housing block 34 of epoxy resin rigidly encompasses the coupling members to form the transducer assembly 20 into a unitary or integral structure. As seen in FIG. 4, wear plates 36 (preferably of sintered aluminum oxide) are provided on the bottom surfaces of the coupling members 22, 24, 26 and 27 to reduce abrasive wearing of the coupling members as they are moved along the workpiece. Outlet ports 41 are provided in the bottom surface 43 of housing 34 and are connected by conduits (not shown) to inlet fitting 35 so as to supply couplant medium (not shown) to the interface between the wear plates 36 and the workpiece 74.

Electrical connectors 52, 54, 55, 56 on the top surface 58 of assembly 20 electrically connect the piezoelectric elements to the electronic circuit assembly 16 through switch 60. Electronic circuit assembly or gauge 16 is a digital ultrasonic measurement gauge (with battery charger) such as the Model M-1 Thickness Gauge manufactured by Harisonics Laboratories in Stamford, Conn. Switch 60 is electrically between the gauge 16 and piezoelectric elements 44, 48, 49, 50 to effectuate switching between the velocity measurement mode and the thickness measurement mode.

As shown in FIG. 1 the transducer carriage 12 is particularly adapted for use on large cast iron workpieces and comprises a support frame 62 to receive and support the unitary transducer assembly 20, a pair of rollers 64 disposed outwardly of the transducer assembly 20 to facilitate movement of the carriage on the workpiece 74, springs 65 for biasing the assembly 20 outwardly of the frame 62 against the workpiece 74 to be tested, and a handle mount 67 for attachment of the retractable handle 14.

As seen in FIGS. 1 and 4, the transducer assembly 20 is slidably received within slot or passageway 63 in the carriage 12 and secured to the plate 66 by the threaded fastener 61. The spring elements 65 bias the plate 66 and thus the transducer assembly 20 downwardly to provide constant pressure on the workpiece 74 during both velocity measurement and thickness measurement modes. As can be seen from FIG. 1, the bottom surface of the transducer assembly 20 is biased slightly below rollers 64 in the absence of a supporting surface or workpiece. Rollers 64 are magnetized to hold the carriage 12 to ferromagnetic workpieces and allow 360° positioning around a circular dryer roll. Other support means extending downwardly from the carriage to provide support on the workpiece may also be utilized.

Outlet ports 69 are provided on the bottom portion of the carriage 12 adjacent the wear plates 36 of the transducer assembly 20 to supply couplant medium to the interface with the workpiece 74. Outlet ports 69 are connected by conduits (not shown) to inlet fittings 71 located on the top surface of carriage 12 for supplying couplant medium. Couplant tank 18 is a pressurized container for the couplant medium necessary to obtain good acoustical coupling between the wear plates 36 and the workpiece to be tested. An acceptable couplant medium is a liquid sold under the trademark HAMIKLEER GRADE 712-2 made by Harry Miller Corp. of Philadelphia, Pa.

As shown in phantom line in FIG. 1, conduit 68 extends through the handle 14 to connect couplant tank 18 to inlet fittings 71 on carriage 12 and inlet fitting 35 of the transducer assembly 20. Valve 70 allows regulation of couplant flow. Electrical cable 75 also extends through handle 14 to electrically connect piezoelectric elements 44, 48, 49, 50 to switch 60 and gauge 16.

In order to position carriage 12 at various points on a large workpiece, the retractable handle 14 is provided although other means for moving the carriage 12 may be utilized such as a remote control chain drive unit 92 (diagramatically shown in phantom in FIG. 1). Furthermore, the transducer carriage 12 and the means for moving the transducer carriage are to be configured and adapted to accommodate the configuration of the particular workpiece; for example, small pipe, large tanks, plates, dryer shells, boilers, etc. The transducer assembly 20 may also be detached from the carriage 12 and manually positioned on a workpiece for thickness measurement.

Figure 5:
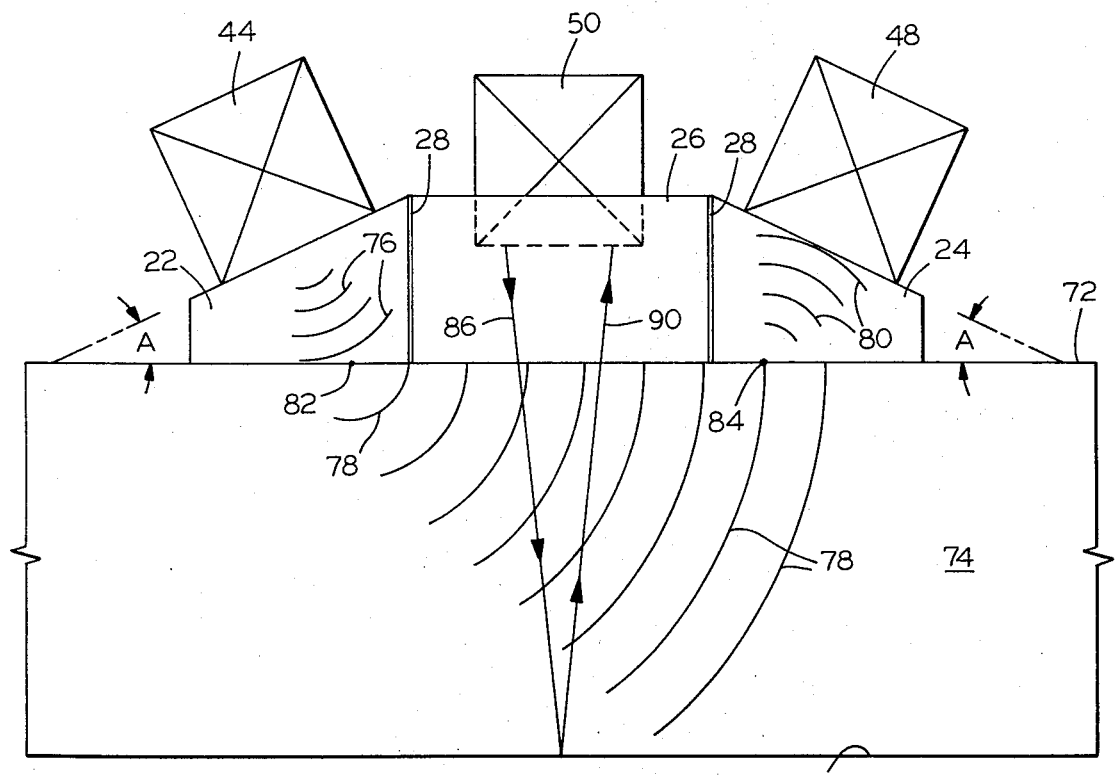
FIG. 5 is a diagramatic view of the transducer elements on a workpiece illustrating the path of ultrasonic waves during operation.

Turning now in detail to the operation of the apparatus and method, this is diagramatically illustrated in FIG. 5. The transducer assembly 20 is positioned against the upper surface 72 of workpiece 74 with sufficient couplant medium between the wear plates 36 and the workpiece surface to insure good acoustic coupling. The switch 60 is initially placed in the "velocity measurement mode" in which the piezoelectric element 44 is driven to transmit ultrasonic waves 76 through coupling member 22 that are incident to surface 72 at a predetermined angle to cause refraction of the waves within workpiece 74 and produce ultrasonic longitudinal waves 78 travelling beneath the surface 72 of workpiece 74; i.e., subsurface longitudinal waves. The buffer barrier 28 between the coupling members 22 and 24 and the intermediate coupling members 26 and 27 prevent direct transmission from piezoelectric element 44 to element 48 (cross-talk), and the intwerposed coupling members 26 and 27 and couplant medium effectively reduce the transmission of surface waves along the workpiece surface 72 to coupling member 24. Subsurface longitudinal waves 78 below the coupling member 24 pass upwardly as longitudinal waves 80 through the coupling member 24 to the piezoelectric element 48.

As seen, the longitudinal waves 76 are incident upon the upper surface 72 at a point identified for purposes of explanation as point 82 and are transmitted upwardly through the coupling member 24 at a point identified as point 84. The distance between point 82 and point 84 is a fixed, predetermined distance. Thus, the velocity, or a relative velocity parameter, of the subsurface longitudinal waves in the workpiece 74 can be determined from the fixed distance and the time relation between transmission of the waves by piezoelectric element 44 and reception by piezoelectric element 48. Velocity is determined by factoring elapsed time into the fixed distance. In using the aforementioned gauge manufactured by Harisonics Laboratories, the calibration knob is adjusted to cause the digital display to correspond to the predetermined distance between the coupling members in order to determine the velocity parameter needed for the subsequent thickness measurement.

Once the velocity parameter has been measured for the material of the workpiece being tested, the switch 60 is placed in the "thickness measurement mode" to allow actuation of piezoelectric elements 49 and 50. The piezoelectric element 50 emits ultrasonic longitudinal waves 86 which travel through the workpiece 74 impinge upon its lower surface 88 to produce an echo or reflected wave 90 back to piezoelectric element 49. Since piezoelectric element 50 is emitting the same type of wave that was utilized to determine the velocity standard, i.e. longitudinal waves, an accurate velocity parameter is thus known for this type of wave in the material of the workpiece 74 for the region between points 82 and 84. Thus, the distance or thickness between surfaces 72 and 88 of workpiece 74 can be accurately determined, i.e., the time relation between transmission of the longitudinal wave and reception of the echo is measured and factored with the measured velocity parameter to determine distance by known pulse-echo techniques.

In this manner, an accurate thickness measurement is obtained based upon an accurate measurement of the velocity parameter of the material between points 82 and 84, and the measurement does not require or rely upon an extraneous calibration standard thay may be inconsistent with the particular metallurgical composition of the workpiece 74 at the area being tested. Furthermore, should workpiece 74 exhibit varying velocity characteristics at different points, the velocity parameter is determined at each area of measurement prior to the thickness measurement. For example, in measuring the large dryer roll shells in the paper industry, the measurement is repeated at spaced-apart intervals along the surface of the shell, and the magnetic rollers facilitate 360° angular placement. At each point of measurement, the velocity parameter of the cast iron is measured prior to measuring thickness. Thus, inconsistencies in the cast iron do not affect the accuracy of the thickness measurement.

As is known in the art, the coupling members may be comprised of any material providing desirable ultrasonic wave transmission characteristics including metal, synthetic resin, and ceramics. Preferably, synthetic resins such as acrylates, polystyrene, polycarbonate, and polyamide are employed. The wear plates for the coupling members may be fabricated of any suitable material providing the desired characteristics of long life and minimal interference with the ultrasonic wave transmission. Sintered aluminum oxide has been found highly satisfactory for this application. The piezoelectric elements will, of course, vary with the particular characteristics of the overall electrical circuit assembly, and various piezoelectric elements may be satisfactorily employed as will be readily appreciated by those skilled in the art.

Exemplary of an assembly for use in measuring the thickness of cast iron dryer roll shells is the following: All of the coupling members are fabricated from polystyrene resin. Referring to FIG. 2, the coupling members 22 and 24 are symmetrical with a height B of 0.38 in., a height C of 0.101 in., a width (not shown) of 0.75 in., a length D of 0.5 in., and an angle A of 29°. Coupling members 26 and 27 are also symmetrical with a height E of 0.2793 in., a width F of 0.5 in., a height G of 0.227 in., a length (not shown) of 0.5 in. and an angle K of incline of the top surface of 6°. A preferred frequency of 1.6 megahertz requires adaption of the previously identified gauge to this frequency. An acceptable driving pulse has been found to be a negative 160 volt pulse of 1 microsecond duration with a 100 nanosecond rise time. Because of the power required to transmit longitudinal waves from piezoelectric element 44 to piezoelectric element 48, attenuation resistors may be utilized with piezoelectric elements 49 and 50 to compensate for this power in the thickness measurement mode.

Modifications to the configuration of the ultrasonic measuring apparatus may be made depending upon the configuration and composition of the workpiece to be tested. The following parameters may be modified: size and frequency of piezoelectric elements, angle of incidence and reception of the ultrasonic longitudinal waves, predetermined distance between points 82 and 84, and material of the coupling members. The interrelationship of the angle of incidence, material composition of the coupling members (namely, the velocity characteristics of longitudinal ultrasonic waves therein) and material composition of the workpiece (namely, the velocity characteristics of longitudinal ultrasonic waves therein) are critical to the generation of subsurface longitudinal ultrasonic waves in the workpiece for purposes of the velocity parameter determination, and are believed to conform to Snell's law regarding the refraction of waves. A variety of materials may be utilized for the coupling elements and it is preferred that the reflection coefficient approach as zero value.

For cast iron workpieces, a range of 18°–35° for angle A is believed operable with synthetic resin coupling members. The range may be increased by variation in the coupling member material and piezoelectric elements. The range of angle K may vary within a range of 0°–10° also depending upon the material and configuration of the workpiece.

Thus it can be seen that the present invention provides an improved ultrasonic measuring apparatus of reliable accuracy for measuring from one surface the thickness between opposed surfaces of a workpiece for which no reliable calibration standard exists or for which the material exhibits inconsistent composition and metallurgical characteristics. Furthermore, accurate, convenient, and quick measurements of large workpieces are attainable in the field.

Having thus described the invention, what is claimed is:

1. An ultrasonic method for measuring the thickness between opposed surfaces of a workpiece from one surface thereof comprising
    (a) measuring a velocity parameter of ultrasonic longitudinal waves through the material of the workpiece at a location along a first surface of a workpiece by
        (i) providing a pair of transducer assemblies on said first surface at points spaced apart a predetermined distance;
        (ii) transmitting ultrasonic waves from one transducer assembly into said first surface at an angle of incidence thereto producing subsurface longitudinal waves;
        (iii) receiving in said second transducer assembly said subsurface longitudinal waves exiting said first surface as substantially the same angle;
        (iv) acoustically insulating said pair of transducer assemblies from transmission of ultrasonic waves directly therebetween; and
        (v) determining a velocity parameter of said longitudinal waves so transmitted and received,
    (b) transmitting ultrasonic longitudinal waves from said first subsurface to the opposite surface of said workpiece,
    (c) receiving the ultrasonic wave reflected from said opposite surface, said transmitting of ultrasonic waves to, and receiving the reflected ultrasonic waves from, the opposite surface being conducted by operation of a third transducer assembly, all of said transducer assemblies being provided wherein the sound transducer assemblies are insulated from transmission of ultrasonic waves directly therebetween;
    (d) measuring a time parameter between transmission of said longitudinal waves and reception of said reflected waves; and
    (e) determining the thickness between said first and opposite surfaces from the measured velocity parameter and the measured time parameter.

2. The method of claim 1 wherein the step (a) for measuring a velocity parameter of ultrasonic longitudinal waves comprises
    (vi) measuring the time between transmission by one transducer assembly and reception by the other transducer assembly of the pair; and
    (vii) determining velocity through the material of said workpiece at said location by factoring the measured time into said predetermined distance.

3. The method of claim 1 wherein the steps (b) and (c) of transmitting ultrasonic longitudinal waves from the first surface to the opposite surface and receiving the reflected ultrasonic waves are conducted at a position between said spaced apart points.

4. The method of claim 1 wherein the step (a) (iv) of acoustically insulating said one transducer assembly from said other transducer assembly comprises providing an acoustical damping material between said pair of transducer assemblies.

5. The method of claim 1 including the step of moving said transducer assemblies from said first mentioned location to a second location on the workpiece, and repeating said steps (a) through (e) to determine thickness at said second location.

6. The method of claim 1 including the step of providing substantially equal delay lines between said first surface and the piezoelectric elements in said first, second and third transducer assemblies.

7. The method of claim 1 wherein the step (a) of measuring a velocity parameter by transmitting and receiving subsurface longitudinal waves includes transmitting the ultrasonic waves from one transducer assembly into said first surface at an angle of incidence within the range of 60°–62° in a workpiece of cast iron.

8. A transducer assembly for measuring the thickness of a workpiece comprising
   (a) a first coupling member having a first surface for disposition against the workpiece being tested and a second surface disposed at an angle thereto;
   (b) a first piezoelectric means for transmitting ultrasonic longitudinal waves mounted on said second surface of said first coupling member for transmitting ultrasonic waves through said coupling member at a predetermined angle of incidence to said first surface;
   (c) a second coupling member having a first surface for disposition against the workpiece being tested in predetermined spacing from said first coupling member and a second surface disposed at an angle thereto;
   (d) a second piezoelectric means for receiving ultrasonic longitudinal waves mounted on said second surface of said second coupling member for receiving ultrasonic waves passing into said coupling member at a predetermined angle to said first surface substantially equal to said predetermined angle of incidence in said first coupling member;
   (e) a third coupling member having a first surface for disposition against the workpiece being tested and a second surface spaced therefrom;
   (f) a third piezoelectric means mounted on said second surface of said third coupling member for transmitting ultrasonic longitudinal waves into the adjacent surface of the workpiece being tested and receiving ultrasonic longitudinal waves reflected back from the opposite surface of the associated workpiece; and
   (g) means for acoustically insulating said coupling members from transmission of ultrasonic waves directly therebetween.

9. The transducer assembly of claim 8 including a housing supporting said coupling members.

10. The transducer assembly of claim 8 wherein said third coupling member is disposed between said first and second coupling members.

11. The transducer assembly of claim 10 wherein said acoustical insulating means is disposed between said third coupling member and each of said first and second coupling members.

12. The transducer assembly of claim 11 wherein said acoustical insulating means includes a layer of organic damping material.

13. The transducer assembly of claim 12 wherein said acoustical insulating means also includes a sheet metal layer.

14. The transducer assembly of claim 12 wherein said organic damping material is impregnated cork.

15. The transducer assembly of claim 8 wherein said predetermined angle of incidence is within a range dependent upon the material of the intended workpiece and the material of the coupling member to generate a subsurface ultrasonic longitudinal wave in the associated workpiece travelling from said first piezoelectric means to said second piezoelectric means.

16. The transducer assembly of claim 8 wherein the predetermined angle of incidence is within a range of 55°–72° for use with a workpiece of cast iron and wherein the material of the coupling member is a synthetic resin.

17. The transducer assembly of claim 8 wherein the predetermined angle of incidence is within a range of 60°–62° for use with a workpiece of cast iron and wherein the material of the coupling member is a synthetic resin.

18. The transducer assembly of claim 8 wherein the delay lines for each said first, second, and third piezoelectric means are substantially equal.

19. The transducer assembly of claim 8 wherein said coupling members include wear plates mounted on said first surfaces thereof.

20. The transducer assembly of claim 8 wherein said third coupling member is comprised of a pair of coupling elements and wherein said third piezoelectric means is comprised of a pair of piezoelectric elements, said pair of coupling elements having second surfaces which extend at angles which are opposite and substantially equal, said pair of piezoelectric elements being mounted on said second surfaces of said coupling elements.

21. The transducer assembly of claim 8 wherein a housing encloses said first, second, and third coupling elements and said piezoelectric means to form an integral structure.

22. The transducer assembly of claim 21 wherein said coupling members include wear plates mounted on said first surfaces thereof.

23. The transducer assembly of claim 22 wherein said housing has couplant ports opening at the surface thereof adjacent said wear plates, conduits extending therefrom, and means for connection of said conduits to a conduit from a couplant medium supply tank.

24. In an apparatus for measuring the thickness of a workpiece from one surface, the combination comprising
   (a) a transducer assembly having
   (i) a first coupling member having a first surface for disposition against the workpiece being tested and a second surface disposed at an angle thereto,
   (ii) a first piezoelectric means for transmitting ultrasonic longitudinal waves mounted on said second surface of said first coupling member for transmitting ultrasonic waves through said coupling member at a predetermined angle of incidence to said first surface,
   (iii) a second coupling member having a first surface for disposition against the workpiece being tested in predetermined spacing from said first coupling member and a second surface disposed at an angle thereto,
   (iv) a second piezoelectric means for receiving ultrasonic longitudinal waves mounted on said second surface of said second coupling member for receiving ultrasonic waves passing into coupling member at a predetermined angle to said first surface substantially equal to said predetermined angle of incidence in said first coupling member, (v) a third coupling member having a first surface for disposition against the workpiece being tested and a second surface spaced therefrom, (vi) a third piezoelectric means mounted on said second surface of said third coupling member for transmitting ultrasonic longitudinal waves into the adjacent surface of the workpiece being tested and receiving ultrasonic longitudinal waves reflected back from the opposite surface of the associated workpiece, and (vii) means for acoustically insulating said coupling member from transmission of ultrasonic waves directly therebetween, and (b) electrical circuit means connected to said first, second, and third piezoelectric means for (i) transmitting ultrasonic longitudinal waves from said first piezoelectric means into said first coupling member to produce subsurface longitudinal waves in the workpiece to be tested, (ii) receiving said subsurface longitudinal waves into said second coupling element to said second piezoelectric means, (iii) determining a velocity parameter of the longitudinal waves so transmitted and received, (iv) transmitting ultrasonic longitudinal waves from said third piezoelectric means through the workpiece (v) receiving ultrasonic longitudinal waves reflected back from the opposite surface of the workpiece, and (vi) measuring a time parameter between transmission of said longitudinal waves and reception of said reflected waves, (vii) determining the thickness of the workpiece from the measured velocity parameter and the measured time parameter.

25. The combination of claim 24 including means for supplying couplant medium to the lower surface of said transducer assembly for providing couplant medium at the interface between said first surfaces of said coupling members and an associated workpiece.

26. The combination of claim 25 wherein said means for supplying couplant medium comprises (a) a tank of couplant medium;

(b) a hose connected to said tank and to said transducer assembly, said transducer assembly having outlet ports adjacent said first surfaces; and (c) valve means to regulate the flow of couplant medium.

27. The combination of claim 24 wherein said transducer assembly includes a carriage supporting said coupling members and said piezoelectric means, and means for moving said transducer carriage along the associated workpiece.

28. The combination of claim 24 wherein said predetermined angle of incidence is within a range dependent upon the material of the intended workpiece and the material of said coupling members to generate a subsurface ultrasonic longitudinal wave in the intended workpiece passing from said first piezoelectric means to said second piezoelectric means.

29. The combination of claim 24 wherein the delay lines for each said first, second, and third piezoelectric means are substantially equal.

30. The combination of claim 24 wherein wear plates are mounted on each of said first surfaces of said coupling members.

31. The combination of claim 24 including means for acoustically insulating said first coupling member and said second coupling member from transmission therebetween of longitudinal ultrasonic waves other than longitudinal ultrasonic waves through the workpiece to be tested.

32. The combination of claim 31 wherein said acoustical insulating means is disposed between said third coupling member and each said first and second coupling members.

33. The combination of claim 24 additionally including a transducer carriage to support said transducer assembly, and further including support means on said carriage extending downwardly from said carriage and spaced outwardly from said coupling members.

34. The device of claim 33 wherein said coupling members are assembled in a housing and wherein said transducer carriage has a passage therethrough in which said housing is movably mounted, and wherein said carriage includes biasing means biasing said housing outwardly of the passage in said carriage to bias the coupling members against the surface of the associated workpiece to be tested.

35. The combination of claim 33 wherein said support means comprises rotatable rollers for movement of said carriage.

* * * * *